Figure 3:
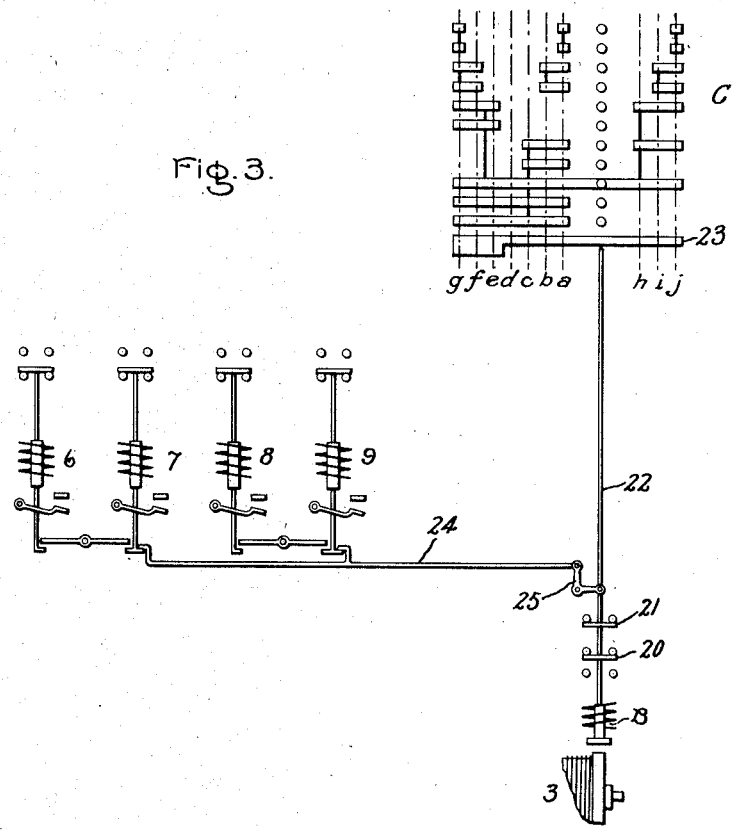

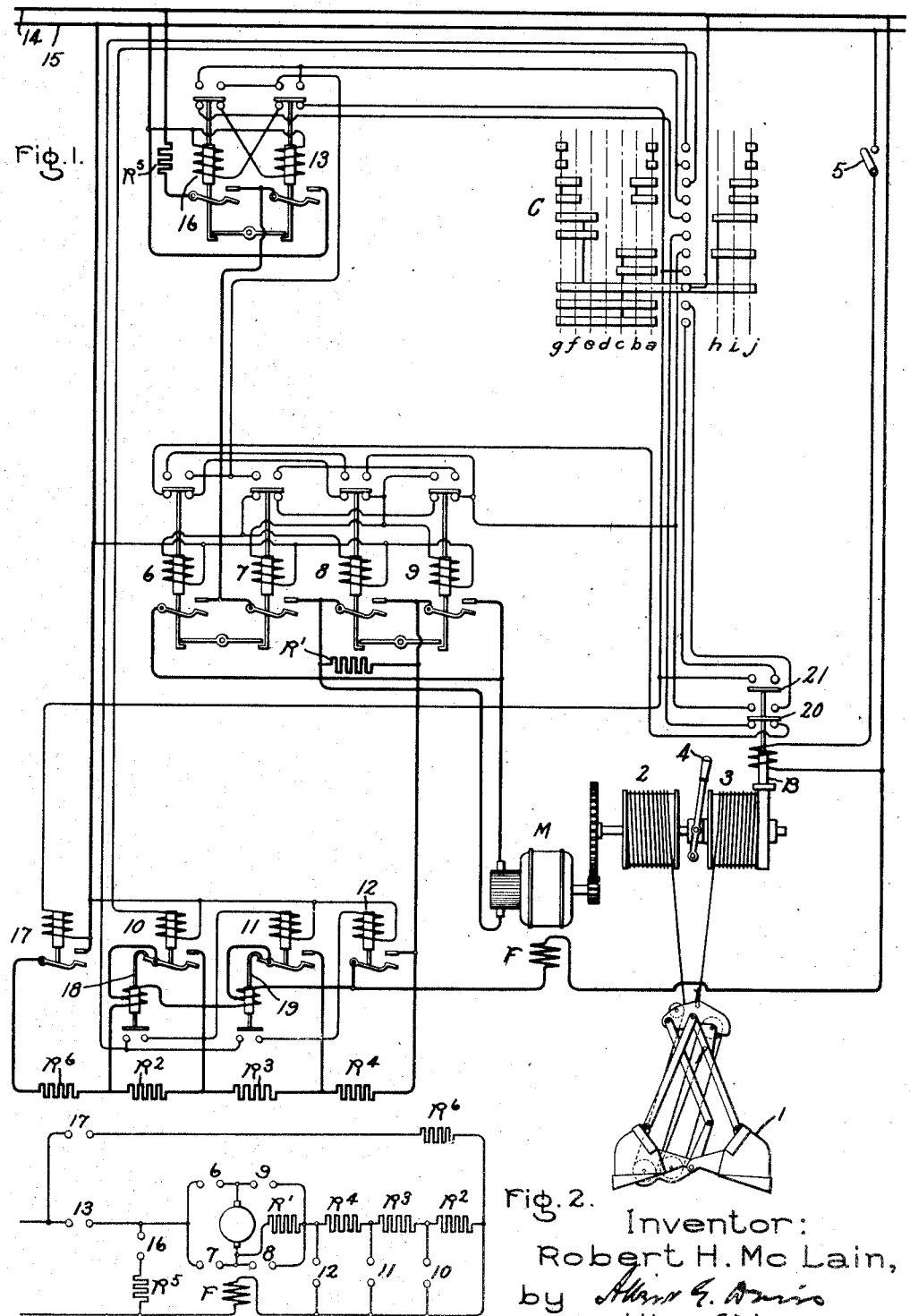

UNITED STATES PATENT OFFICE.

ROBERT H. McLAIN, OF SCHENECTADY, NEW YORK, ASSIGNOR TO GENERAL ELECTRIC COMPANY, A CORPORATION OF NEW YORK.

MOTOR CONTROL FOR HOISTS.

1,386,885.        Specification of Letters Patent.        Patented Aug. 9, 1921.

Application filed May 7, 1919. Serial No. 295,411.

*To all whom it may concern:*

Be it known that I, ROBERT H. McLAIN, a citizen of the United States, residing at Schenectady, in the county of Schenectady, State of New York, have invented certain new and useful Improvements in Motor Control for Hoists, of which the following is a specification.

My invention relates to the control of electric motors and provides improved means whereby the motors are started and stopped and generally controlled in a safe, reliable and efficient manner.

More particularly my invention relates to the control of electric motors for operating grab bucket hoists of the type in which the electric motor is used for hoisting and for closing and opening the jaws of the bucket. When the lacing drum is operated independently of the holding drum, a brake is applied to the holding drum in order to hold the bucket in position during the interval of opening or closing the jaws of the bucket. Grab buckets are ordinarily constructed so that the jaws of the bucket will open by gravity, but due to the friction and the fly-wheel effect of the lacing drum, the motor armature, etc., the bucket will either not open or open very slowly. Speed of operation is very desirable, and arrangements have been heretofore provided whereby the driving motor can be operated in a reverse direction from that during hoisting, so as to permit the jaws of the bucket to open by gravity, unhampered by any other friction than that of the parts of the bucket itself. In these former arrangements, the motor was connected in such a manner that there was a considerable waste of power, the sacrifice in power being made to secure a safe connection for the motor. One of the commonest of the former arrangements is that of connecting the motor and its series field in shunt circuits with a resistance in each of the parallel paths. Such a connection wastes power and if the resistance of the series field circuit is increased to save power, a dangerous speed is likely to be obtained.

In accordance with my invention I provide an improved arrangement whereby a greater speed during reversal can be had than with the previous arrangements and a saving in power effected. A dangerous speed would be attained if this connection were used to lower the bucket, so in order to insure that this reverse connection cannot be made except when the lacing drum is to be reversed to open the bucket, I interlock the brake on the holding drum with the motor control in such a manner that the brake must be applied to the holding drum before the motor can be reversed. In carrying my invention into effect I preferably operate the motor as a series motor during reversal and include a shunt around the motor armature to prevent the attainment of dangerous speeds, although it will be apparent to those skilled in the art from an understanding of my invention that in certain of its aspects, my invention is also applicable to the former arrangements to which I have above referred where a saving in power in such arrangements is desired. By my improved arrangement it is impossible to reverse the motor when the brake is released from the holding drum, but if the brake is set, thus preventing the bucket from falling and a dangerous speed attained, it will be possible to reverse the motor to open the bucket.

For a better understanding of my invention, reference is had to the accompanying drawings in which Figure 1 shows a motor control for a grab bucket hoist embodying my invention; Fig. 2 is a simplified schematic diagram of the motor circuits; and Fig. 3 is a simplified diagram showing a mechanical interlocking arrangement between the brake, the motor controller and the motor reversing switches.

Referring to Fig. 1, the grab bucket 1 is operated by means of the electric motor M having a series field F, the motor driving the lacing drum 2 and the holding drum 3 through suitable reduction gearing. The clutch 4 is provided for operating the lacing drum independently of the holding drum and an electromagnetic brake B coöperates with the holding drum. The brake B is provided with an electrical interlocking arrangement which coöperates with the motor controller C whereby the motor M cannot be reversed to lower the bucket, and whereby the motor cannot be reversed to operate the lacing drum 2 so as to unwind the cable of the lacing drum and permit the jaws of the bucket to open by gravity unless the brake B is applied to the holding drum. The controller C has a plurality of operative positions, *a* to *j* inclusive, the positions *a*, *b* and *c* for including the motor in a local dynamic braking circuit for lowering the bucket, the position $d$, a transition position, the positions $e$, $f$ and $g$ for reversing the motor when the brake B is applied to the holding drum, and the positions $h$, $i$ and $j$ for connecting the motor to the source of supply to hoist the bucket. The brake B is controlled by means of the pilot switch 5, the closing of which energizes the magnet winding of the brake and releases the brake. The electromagnet switches 6, 7, 8 and 9 are provided for reversing the connections of the motor armatures to the source of supply, the switches 6—8 being provided for connecting the motor armature for hoisting and dynamic brake relations and the switches 7—9 being provided for reversing the motor armature whereby the motor can be operated in the reverse direction to unwind the cable on the lacing drum 2. When this reversing connection is established the motor is connected as a series motor to the source of supply with the resistance $R^1$ shunted across the motor armature. During hoisting and dynamic braking the resistance $R^1$ is short circuited by switch 8. These electromagnet switches are electrically and mechanically interlocked in a well known manner, so that when the pair 6—8 is closed, the pair 7—9 is prevented from closing, and vice versa, when the pair 7—9 is closed the pair 6—8 is prevented from closing. The electromagnet switches 10, 11 and 12 are provided for short circuiting the starting and controlling resistances $R^2$, $R^3$ and $R^4$ respectively. The electromagnet switch 13 serves as a line contactor to connect the motor to the source of supply 14—15, and the electromagnet switch 16 is provided for connecting the motor in a local dynamic braking circuit which includes the braking resistance $R^5$. The electromagnet switches 13—16 are suitably mechanically and electrically interlocked, so that when one is closed the other is prevented from closing. The electromagnet switch 17 is provided for separately exciting the motor series field F during the dynamic braking interval through a circuit from the source of supply including the resistance $R^6$. Electrical interlocks are provided with the electromagnet switches 13, 16, 6, 7, 8 and 9 whereby the electromagnet switches 10, 11 and 12 for short circuiting the starting and controlling resistances $R^2$, $R^3$ and $R^4$ cannot be closed unless the proper switching is established. Thus, for instance, switches 13, 6 and 8 must be closed for the hoisting connections before the switches 10, 11 and 12 can be closed; switches 13, 7 and 9 must be closed before these resistance switches can close during the reversal of the motor, and switches 16, 6 and 8 must be closed before these resistance switches can close during the dynamic brake interval.

As thus constructed and arranged, the operation of my invention is as follows: The grab bucket 1 is shown in the elevated position. In order to lower the same so that material may be lifted, the controller C is first turned to the right to the position $a$, thereby energizing electromagnet switches 16, 17, 6, 8, 10, 11 and 12 to close, thus separately exciting the motor series field F and connecting the motor in a local dynamic braking circuit. The pilot switch 5 is then closed and the electromagnet brake B is released from the holding drum 3 so that the bucket may be permitted to drop by gravity with the clutch 4 to the right hand position. To vary the rate at which the bucket is lowered, the controller C is moved to either position $b$ or $c$, thereby varying the dynamic braking effect. At position $b$ the magnet windings of switches 11 and 12 are deënergized and these switches are opened, inserting resistances $R^3$ and $R^4$ in the dynamic brake circuit. At position $c$ the magnet winding of switch 10 is also deënergized and this switch is caused to open and insert the resistance $R^2$ in the dynamic brake circuit. When the bucket has been thus lowered to the material which is to be hoisted, the controller C is returned to the off position, the clutch 4 is thrown to the left, thereby disconnecting the lacing and holding drums and permitting the lacing drum to be operated independently of the holding drum. The controller C is then moved to the left to the position $h$ and electromagnet switches 13, 6 and 8 are energized and the motor is operated in the hoisting direction to wind up the cable on the lacing drum 2 so as to close the jaws of the bucket and include a load of material in the bucket. The speed of closing the jaws of the bucket may be increased if desired by moving the controller to either the position $i$ or $j$, thereby energizing the resistance switches 10, 11 and 12 to close and short circuit the starting resistances $R^2$, $R^3$ and $R^4$. When the jaws of the bucket are closed, the clutch 4 is thrown to the right, thereby connecting the lacing and the holding drums to the motor. In order to hoist the bucket, the controller C is turned to the left to the position $h$, thereby energizing the switches 13, 6 and 8 to close as before. To increase the hoisting speed, the controller is moved to the position $i$ at which the electromagnet switch 10 is energized to close and short circuit the armature resistance $R^2$. Associated with this electromagnet switch 10 is a current limit throttle 18 of a well known construction. This throttle is mechanically picked up by the opening of a switch 10 and is permitted to drop and close its contacts responsively to the motor current after the switch 10 has closed. When the throttle drops and closes its contacts, it permits the energization of the winding of switch 11 when the controller C is turned to the position *j*. The electromagnet switch 11 has also a current limit throttle 19 which controls the magnet winding of switch 12. In position *j* the starting resistances are all cut out, provided the motor current is of such value that the throttles 18 and 19 can close, and the motor is operating at its highest speed. When the bucket has been hoisted to the proper position the controller C is returned to the off position and the pilot switch 5 is opened and the brake B applied to the holding drum 3. The clutch 4 is then thrown to the left, disconnecting the lacing and the holding drums. In order to open the jaws of the bucket the controller C is moved to the position *e* at which the motor is connected to the source of supply as a series motor with the motor armature reversed and the resistance $R^1$ shunted across the motor armature terminals. In this position the switches 13, 7 and 9 will be closed. It will be noticed that the coil circuit for switches 7 and 9 is through the interlock 20, and that unless the brake B is applied to the holding drum this interlock will not be closed and the reversing switches 7—9 cannot be energized to close. In case it is desired to operate the motor at a greater speed to unwind the cable on the lacing drum 2, the controller is moved to either one of the positions *f* or *g*, thereby energizing the switches 10, 11 and 12 to close and short circuit the armature resistances $R^2$, $R^3$ and $R^4$ in the same manner as during the hoisting interval. By connecting the motor as a series motor for opening the jaws of the bucket, a greater speed of operation is obtained and a saving in time effected. Under certain circumstances it may be necessary to insure that the speed of the motor during the interval of opening the jaws of the bucket shall not be dangerously great, and to take care of that condition, the resistance $R^1$ shunted around the motor armature is provided. For certain installations, depending upon the design of the series motor and the friction of the lacing drum, the reducing gearing, etc., the shunt around the motor armature may not be required. When the jaws of the bucket have been opened, the controller is moved to the off position, and the clutch 4 is thrown to the right preparatory to connecting the motor in the local dynamic brake circuit for lowering. With my arrangement for reversal an increased speed of operation is obtained and a substantial saving in power is effected. In arrangements for reversal heretofore commonly used, such as the connection of the motor armature and series field in shunt circuits, as much as 50 per cent. of the power required for the motor has been used to separately excite the motor series field during reversal. With my improved arrangement there is no such waste of power since the motor is connected as a straight series motor during reversal, and only approximately 5 per cent. of the power is wasted in the shunt path around the motor armature where such shunt path is required. However, it will be apparent to those skilled in the art that my invention is also applicable to the former motor control arrangements where a saving of power and increased speed is desired.

It would be dangerous to use the connection which I have provided for reversal for lowering the bucket, because the motor would attain a dangerous speed, and I have therefore interlocked the controller C, the reversing switches 7—9 and the brake B in such a manner that the reversing switches cannot be energized to close unless the brake is applied to the holding drum, thereby insuring that the reversal of the motor can only be effected to open the jaws of the bucket and not for the lowering of the bucket.

The electrical interlock 21, coöperating with the interlock 20 when the brake B is released, insures that the motor will be connected in a dynamic brake circuit throughout positions *a* to *g* inclusive of the controller C.

It will be apparent that while I have shown an electrical interlocking arrangement between the brake, the controller, and the reversing and motor controlling switches, any suitable form of interlocking arrangement may be used to accomplish the objects of my invention.

In Fig. 3 I have shown a mechanical interlocking arrangement between the controller C, the reversing switches 7 and 9 and the brake B which may be used in conjunction with the electrical interlocking described in connection with Figs. 1 and 2, or which may be used alone without the electrical interlocking. This figure is very diagrammatic, and since the motor control is the same as that shown in Fig. 1, for the sake of simplicity of the drawing and an easy understanding, the motor control has been omitted. In this figure the rod 22 attached to the brake B coöperates with a segment 23 on the controller C, whereby the controller is mechanically prevented from being turned to the positions *e*, *f* and *g* so as to operate the motor M in the reverse direction unless the brake B is applied to the holding drum 3. A mechanical detent 24 connected to the rod 22 by means of link 25 serves to mechanically hold open the reversing switches 7 and 9 as long as the brake B is released from the holding drum. When the brake is applied to the holding drum, the detent 24 is released from the reversing switches 7 and 9. It will be obvious to those skilled in the art that the electrical interlocking arrangement as shown in Fig. 1, the mechanical interlock between the controller C and the brake B, or the mechanical interlock between the brake and the reversing switches 7 and 9 may either be used singly to prevent the reversal of the motor unless the brake is applied to the holding drum, or all of these interlocking arrangements may be provided as desired.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. The combination in a grab bucket hoist of a holding drum, a lacing drum, an electric motor having a series field for operating the drums, a brake for the holding drum, means for reversing the motor to unwind the cable on the lacing drum, and means for preventing the reversal of the motor unless the brake is applied to the holding drum.

2. The combination in a grab bucket hoist of a holding drum, a lacing drum, an electric motor having a series field for operating the drums, means for reversing the motor to unwind the cable on the lacing drum, and means for preventing reversing the motor to lower the bucket.

3. The combination in a grab bucket hoist of a holding drum, a lacing drum, a series wound electric motor for operating the drums, means for connecting the motor to a source of supply as a series motor for operating the lacing drum to unwind the lacing cable, a brake for the holding drum, and means whereby the said connection can only be established when the brake is applied to the holding drum.

4. The combination in a grab bucket hoist of a holding drum, a lacing drum, a series wound electric motor for operating the drums, a controller having means for connecting the motor to a source of supply to hoist the bucket, connecting the motor in a local dynamic brake circuit to lower the bucket, and reversing the motor and connecting a shunt around the motor armature for operating the lacing drum to unwind the lacing drum cable, a brake for the holding drum, and means for interlocking the brake and the controller to prevent reversing the motor unless the brake is applied to the holding drum.

In witness whereof, I have hereunto set my hand this 6th day of May, 1919.

ROBERT H. McLAIN.